United States Patent [19]

Damerau

[11] 4,330,845
[45] May 18, 1982

[54] GUESS-AHEAD FEATURE FOR A KEYBOARD-DISPLAY TERMINAL DATA INPUT SYSTEM

[75] Inventor: Frederick J. Damerau, Purdys, N.Y.

[73] Assignee: International Business Machines Corporation, Armonk, N.Y.

[21] Appl. No.: 108,774

[22] Filed: Dec. 31, 1979

[51] Int. Cl.³ .......................... G06F 3/02; G06F 3/14; G06F 7/34
[52] U.S. Cl. .......................... 364/900; 340/146.3 WD
[58] Field of Search ... 364/200 MS File, 900 MS File, 364/419; 340/146.3 WD

[56] References Cited

U.S. PATENT DOCUMENTS

| | | | |
|---|---|---|---|
| 3,448,436 | 6/1969 | Machol, Jr. | 364/900 |
| 3,568,156 | 3/1971 | Thompson | 364/900 |
| 3,755,784 | 8/1973 | Greek, Jr. et al. | 364/900 |
| 3,757,311 | 9/1973 | Byram et al. | 364/900 |
| 3,911,403 | 10/1975 | O'Neill, Jr. | 364/900 |
| 4,028,677 | 6/1977 | Rosenbaum | 364/900 |
| 4,041,467 | 8/1977 | Cota et al. | 364/900 |
| 4,125,868 | 11/1978 | Hruby et al. | 364/900 |
| 4,136,395 | 1/1979 | Kolpek et al. | 340/146.3 WD |
| 4,158,236 | 6/1979 | Levy | 364/900 |
| 4,193,119 | 3/1980 | Arase et al. | 364/900 |
| 4,204,206 | 5/1980 | Bakula et al. | 364/900 |

FOREIGN PATENT DOCUMENTS

1442591   7/1976   United Kingdom ............... 364/900

*Primary Examiner*—Gareth D. Shaw
*Assistant Examiner*—Eddie P. Chan
*Attorney, Agent, or Firm*—Roy R. Schlemmer, Jr.

[57] ABSTRACT

A guess-ahead feature for an interactive terminal having a keyboard and a display screen where input data is entered via the keyboard and displayed. Means are provided for continually evaluating input data to determine if it is the beginning of a string of data stored in the system memory. If the input data is determined to match the beginning of the string of prestored data, the complete string of stored data is displayed without moving the cursor. A function key is provided so that if the displayed complete string is the string the terminal operator desires to enter, the terminal operator can, by the depressing the function key, advance the cursor to the end of the string. If, however, the displayed string is not exactly as desired, the operator merely continues keying input data.

8 Claims, 9 Drawing Figures

| FIG. 1-1 |
| FIG. 1-2 |

GUESS-AHEAD FEATURE FOR A KEYBOARD-DISPLAY TERMINAL DATA INPUT SYSTEM

DESCRIPTION

TECHNICAL FIELD

The continued advance of technology in the electronic data processing industry has made the data processing capabilities of large modern computers available to an ever widening variety of applications. Thus many of the complex functions available only in systems including large central processors is now available, at reasonable cost, on smaller, less erudite systems.

A particular case in point is the ever increasing use of interactive display terminals which include a keyboard for entering data, a CRT type display for displaying data entered via the keyboard and often an associated typewriter like printing device. In addition, the terminal has a relatively large memory capacity for storing and displaying data entered into the terminal and for performing quite sophisticated editing operations such as the insertion of data at some desired point in the text, the deletion of data, the substitution of data, as well as a wide variety of features such as line justification, margin adjustment, etc. In addition, providing sufficient computational ability is included in the terminal per se or in the central processor to which it is attached, additional features such as the automatic detection of spelling errors, hyphenation, and others are now available to such terminals.

Typical of such interactive terminal systems is the IBM Office System 6, Word Processor/32.

As with all data input systems, time and thus speed of inputting is of the greatest importance in terms of both total amount of material that can be entered into the system and also the per item cost of inputting. In the case of a typewriter like input terminal, the data input speed is generally limited by the typing speed of the typist or operator using the terminal. As is well known, the speed can vary with the given typist from approximately twenty to thirty words per minute to, in some cases, over one hundred. There is accordingly a great need in the electronic computer industry and especially at the word processing level to develop systems whereby raw data may be entered into the system more quickly and efficiently and thus at lower cost.

Past efforts in this direction have been largely limited to the preentering and storing of form letters or paragraphs in the system memory wherein said prestored paragraphs may be called for by the entry of an appropriate key or code whereby the entire stored data segment will be displayed and/or printed. In the case of form letters, blanks in the letters may be appropriately chosen and, by utilizing the blanks as parameters, appropriate new material may be entered into the system and automatically merged with the prestored material to form a finished product.

These systems, while extremely efficient for the particular job required, are quite limited in use to situations where an extremely large body of material must be frequently entered in order for an operator to learn the access key and specifically request the accessing of the particular prestored data.

It is accordingly a primary object of the present invention to provide a completely automatic means for detecting the occurrence of a "probable string" of input data occurring in a large batch of data being entered via a keyboard into an interactive keyboard/display terminal system.

It is a further object to provide such a system for displaying the "probable string" on the display means and for entering said string in its entirety if accepted by the operator.

It is yet another object of the invention to provide such a system wherein the data is continuously monitored by the system as each new word is entered into the terminal whereby maximum effectiveness is achieved.

It is another object to provide such a system wherein no special codes or keys need be learned by the operator and virtually no training other than typing and overall terminal operation need be learned.

It is another object of the invention to provide such features with the addition of a minimal amount of hardware and controls.

Other objects, features and advantages of the present invention will be apparent from the subsequent description of the disclosed embodiment as set forth in the accompanying description and drawings.

BACKGROUND ART

U.S. Pat. No. 3,753,233, "Method and Apparatus for Data Entry", of N. W. Cardell, Jr. et al, issued Aug. 14, 1973. This patent discloses a data entry system for a stockbroker's terminal which displays alternative words in groups on a line ranging from left to right according to their descending frequency of use. Data entry is accomplished by erasing the words in each line that do not apply and tabbing over the word or words that do apply to complete a desired line. This patent relates to a human engineering aid for data entry utilizing an interactive terminal, however, no guess-ahead feature for possible long data strings is disclosed or suggested.

The article entitled, "Intelligent Terminal Thesaurus Function" by N. C. Hien and M. I. Lilie, IBM Technical Disclosure Bulletin, Vol. 21, No. 8, January 1979. This article discloses a data entry system for use within an interactive terminal wherein, when an operator enters an incorrect command to the system, instead of "ABENDING" the operation, the theasaurus feature is activated. At this point the system will extract from its theasaurus list the word which should have been entered into the system and (1) give the operator an opportunity to change the input just entered to the proper command as displayed or (2) at least advise the operator that the system has detected some error in command. There is no suggestion or teaching of a guess-ahead feature in this article.

The article entitled, "Chinese Typewriter System" by B. Dunham and H. Wang, IBM Technical Disclosure Bulletin, Vol. 19, No. 1, June 1976. This article discloses inputting a relatively small number of strokes of a Chinese ideographic character whereupon the system goes to its memory, searches and displays as many characters stored therein as are generic to the current input strokes. At that time a plurality of characters are placed upon a display screen and the operator selects one of the characters if appropriate. The system disclosed in the article, although a data input system is a symbol processor and not a data processor.

BRIEF DESCRIPTION OF THE DRAWINGS

FIG. 1 comprises an organizational drawing for FIGS. 1.1 and 1.2.

FIGS. 1.1 and 1.2 comprise a functional block diagram of an interactive keyboard/display terminal incorporating the guess-ahead feature of the present invention.

FIG. 2 comprises an organizational drawing for FIGS. 2.1 through 2.3.

FIGS. 2.1 through 2.3 comprise a flow chart illustrating the sequences of operation in the interactive keyboard/display terminal with the guess-ahead feature as set forth in the hardware diagram of FIGS. 1.1 and 1.2.

INDUSTRIAL APPLICABILITY

The present guess-ahead feature would have particular utility in application areas utilizing highly stylized and redundant text and would permit the faster entry of the text via keyboard into such systems having appropriate display capabilities. Thus, a maximum data input could be obtained, from minimum key stroking, in those areas where there is a high probability of long strings of data or text being used recursively. One example might be in legal offices where the writers (i.e. lawyers) use highly repetitive phrases and sentences in contracts and other legal documents. It is possible with many "boiler plate" contract situations that such a guess-ahead feature could greatly facilitate the entry of long sentences, paragraphs, etc., of specification, standard or form paragraphs, etc. Such "boiler plate" is common in many contracts in which the overall contract may have considerable variation. Another possible area of application would be for the inputting of programs into a computer via such an interactive terminal wherein large segments of a program might be conveniently entered via such a system.

Many other application areas will of course be apparent to those skilled in the art, it being clearly understood that the specific strings of data selected as well as the keys would have to be entered into the system as a result of experience with the particular types of data base.

Assuming that the Key Memory and the Replacement Memory would have finite space limitations, some sort of simple replacement algorithm could be provided so that whenever new string candidates are submitted to the system they would replace the least frequently used numbers currently resident in said memories. As will be appreciated by those skilled in the art, such replacement algorithms could be similar to page replacement algorithms used in current high speed hierarchical memory systems.

In summary, the present invention has application to any text data input system using interactive or even stand alone keyboard/display terminals wherein the nature of the data base is such that there is a reasonable probability of recurrent data strings being used. It will of course be obvious that the success of the system will be to a large extent dependent upon the skill and experience of the operator utilizing the system and also upon the skill of the systems programmers having responsibility for selecting the particular strings and keys to be stored in the system.

While the invention has been specifically set forth and described with respect to the herein disclosed embodiment, it will be readily appreciated by those skilled in the art that many changes in form and detail could be made without departing from the spirit and scope of the invention as set forth in the appended claims.

DISCLOSURE OF INVENTION

The present invention comprises a terminal enhancement especially suited for interactive keyboard/terminal Systems such as the IBM Office System 6, Word Processor/32 and its successors. The enhancement is referred to herein as a "Guess-Ahead" feature. Utilizing the present invention, word strings of text data being entered into such a terminal which recur with sufficient frequency, are stored in the system memory. With each string is stored a predetermined number of its characters (i.e., words) counting from the left end (i.e., the natural order of entry) which constitutes the particular string's key. As will be apparent from the following description, the particular strings selected for storage as well as the size of the particular keys might vary widely by industry and/or application areas.

As the typist enters text data, the characters or words stored in the terminals input buffer register are displayed in a conventional manner and periodically compared with the string 'keys' stored in the system memory. The compare or match may be performed utilizing as many of the characters or words of the new data string being actually entered into the terminal as desired. Such a system would normally have a predetermined maximum size key which can be entered into the system for matching purposes. However, given keys may not be as large as this maximum.

When a key is matched, the stored character string is added to the display, to the right of the current positon, but the input cursor on the display is not changed. If the typist or operator continues to type characters, as soon as a character different from a 'guessed' character is typed, all characters to the right of the input cursor are erased.

This feature accomplishes two functions. First it allows the typist to overrun slightly beyond the key without destroying the entered string data when she is not aware that a new string has been placed on the display screen. Secondly, if a mismatch occurs it automatically indicates to the system controls that the displayed data string is not the one desired by the typist, and the string is automatically removed from consideration.

If the typist accepts the guessed string by pressing a special key, foot pedal, or the like the input cursor is automatically moved to the end of the 'guessed' input string and the typist begins entering new data from that position.

The present guess-ahead feature can be implemented on current interactive keyboard/display terminals in hardware logic, in micro code driving a special purpose control unit, or by software programs written in an instruction language compatible with the computation facilities associated with the terminal.

The present guess-ahead feature differs from previously known proposals for storing and recalling repetitive text segments on command. It does not require a typist to know and memorize special identification codes to access and cause entry of the stored data segment located in the system memory. It should be noted, however, that the present system does not preclude the use such a data entry feature.

Since the typist need take no action in the case of an erroneous guess by the system control, such wrong guesses should not materially effect the data input by the typist. Further, in common with other known systems which retrieve stored text from memory, use of the present guess-ahead feature should materially reduce errors and subsequent text correction time.

In the presently disclosed system, the maximum number of words upon which a key search will be performed is five. However, the length of the words is not limited as adequate storage space would be provided in the Input Buffer Register to accept words of significant length. It will of course be understood that the maximum number of words allowable in the keys could be altered to be either less than or significantly greater than five, with minimum modification of the present system.

As each new word is entered into the system, it is separated from the next word by an appropriate word terminator symbol denoted herein by (*). This symbol is recognizable to the system controls and would in practice be the particular code representation for a blank or space between successive words. As each new word is entered into the system an automatic search procedure is undertaken. The new word is first combined with all of the words currently in the Input Buffer Register as the match criteria for all of the keys stored in system and in the event that no match is found successive words at the left end of the Input Buffer Register are deleted from the search argument until only the new word is sent as the last argument. Thus assuming a string of words "NOW IS THE TIME FOR" is located in the Input Buffer, completion of the entry of the word FOR would first cause the search argument "NOW IS THE TIME FOR" to be utilized in the key search. The subsequent search arguments would be, "IS THE TIME FOR "; "THE TIME FOR"; "TIME FOR"; and finally "FOR".

Assuming that no match was found upon termination of the search procedure the oldest word in the Input Buffer Register would be deleted and a new word entered. Thus, in the above expression the word "NOW" would be deleted and the new word "ALL" would be entered and a new search sequence would be performed as described above. This operation would continue until either the entire data text entry operation is completed or until a successful string match is found and the associated complete string accessed from system memory and placed in the display.

At this point, as stated previously, the typist would press the 'accept' button which would cause the terminal controls to initialize the system and the data inputting operation would continue at the point following the end of the string. The match argument would again be successively built up a word at a time until the entire Input Buffer Register is filled to form a new five word argument, and as each new word is entered the oldest word is effectively bumped out of the register.

The disclosed system requires an exact match of the argument with the stored keys in order for a particular string to be selected and displayed and it is further assumed that there will be only one string for each key. However, as will be appreciated, it would be possible to display more than one string having the same key and to provide appropriate means for the typist to select a desired one of the strings displayed.

Other modifications and enhancements of the herein disclosed guess-ahead system will be apparent from the subsequent description of the disclosed embodiment.

BEST MODE FOR CARRYING OUT THE INVENTION

Figures 1, 12:
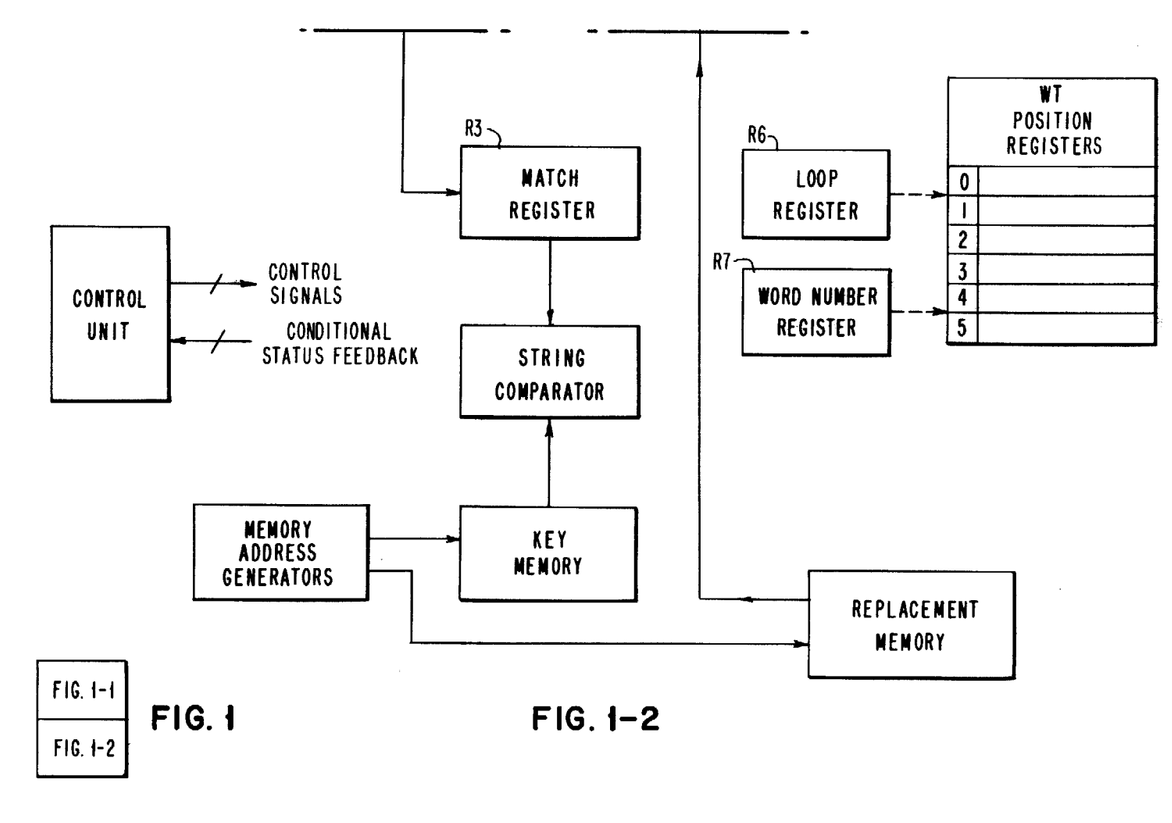

A suitable hardware embodiment for performing the herein disclosed guess-ahead feature is set forth in FIG. 1. The figure comprises a functional block diagram of a suitable keyboard/display terminal having significant logic and control facilities as well as local storage.

Suitable interactive terminals for use with the present system would be the aforementioned IBM Office System 6, Word Processor/32, as well as the IBM 3250, 3270 and 3760 interactive terminals. Any of these systems could be modified relatively easily to perform the present guess-ahead function.

Referring to FIG. 1, the portion of the hardware above and to the left of the dotted line would already reside in any of the above mentioned interactive terminals. Similarly the block labeled Replacement Memory could be part of the overall memory facility within such a sophisticated interactive terminal.

Figure 4:
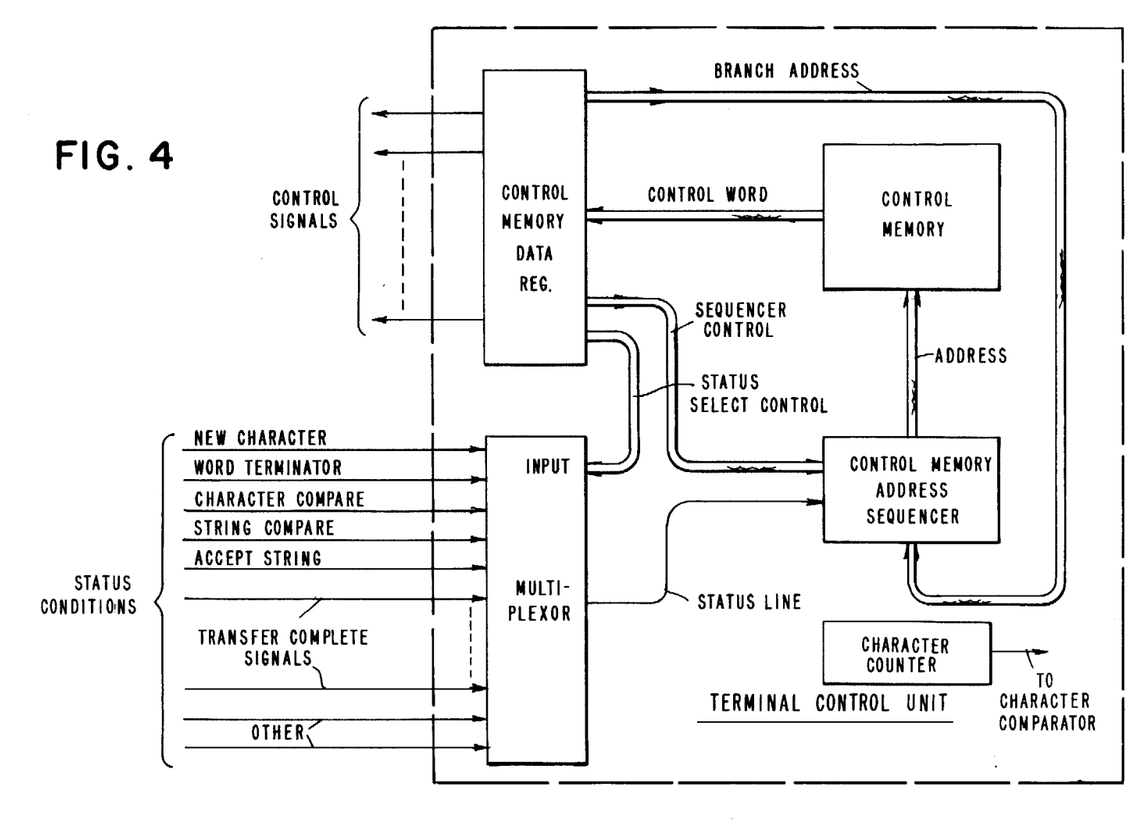
FIG. 4 comprises a functional block diagram illustrating the architecture of the Control Unit as shown in FIG. 1.1.

Returning now specifically to the figure, it will be noted that the various functional units shown represent the necessary architectural elements to perform the requisite data input operations, the successive string searches and finally the entry of successfully detected strings into the terminal's input data memory as represented by the Display Buffer Register and the Display Controller. Control of this architectural framework is by an appropriately designed microprocessor which comprises the Control Unit. As is well understood, this microprocessor or Control Unit would be typically configured as shown in FIG. 4 and includes a Read Only Memory in which appropriate micro code is stored, an Output Buffer/Decoder into which the control words accessed from the memory are stored and decoded and the Input Multiplexor for determining when various operations are completed, branch conditions and other signals well known in the art for effecting the operation of such microprocessor control units. The block marked Branch Control operates in conjunction with the Input Multiplexor to determine whether and when a particular branch is to be taken in the control sequence.

Thus in summary, the Control Unit functions to send out control signals to the various functional units shown in FIG. 1. It gates data into or out of specified registers, increments and decrements certain control counters, and causes initiation of the search routines within the Key Memory under control of the Memory Address Generator. It subsequently causes the access of complete strings in the Replacement Memory. The line marked Conditional Status Feedback entering the Control Unit comprises the required inputs into the Input Multiplexor from the various functional units within the system such as the Character Comparitor and the String Comparator as well as standard handshaking signals.

It should be understood at this time that the particular mechanism by which the actual comparison operation is performed could take on many forms. The present embodiment conditions a single String Comparator for sequentially comparing the contents of the Match Register with words stored in the Key Memory which would be serially accessed and gated to the String Comparator. However, it would be apparent to those skilled in the art that the Key Memory and String Comparator could, if desired, comprise one extremely large associative memory which would in effect simultaneously compare all of the contents of said associative memory against an argument stored in the Match Register. Details of such a system are considered to be obvious to those skilled in the art and do not per se form a part of the present invention.

The specific gate circuits for controlling the flow of data within the system are not shown as they are considered obvious. Similarly, the status signals from the aforementioned functional units such as the Character Compare Block, the String Compare Block and the Word Terminator Detector, are not specifically set forth as their implementation would be obvious. For example, a single output line from any of these units would form a portion of the input constituting the Conditional Status Feedback for the Control Unit. A binary "1" appearing on a given line might indicate a successful 'compare', whereas a binary "0" on the same line would represent a 'no compare' condition.

Figures 2, 23:
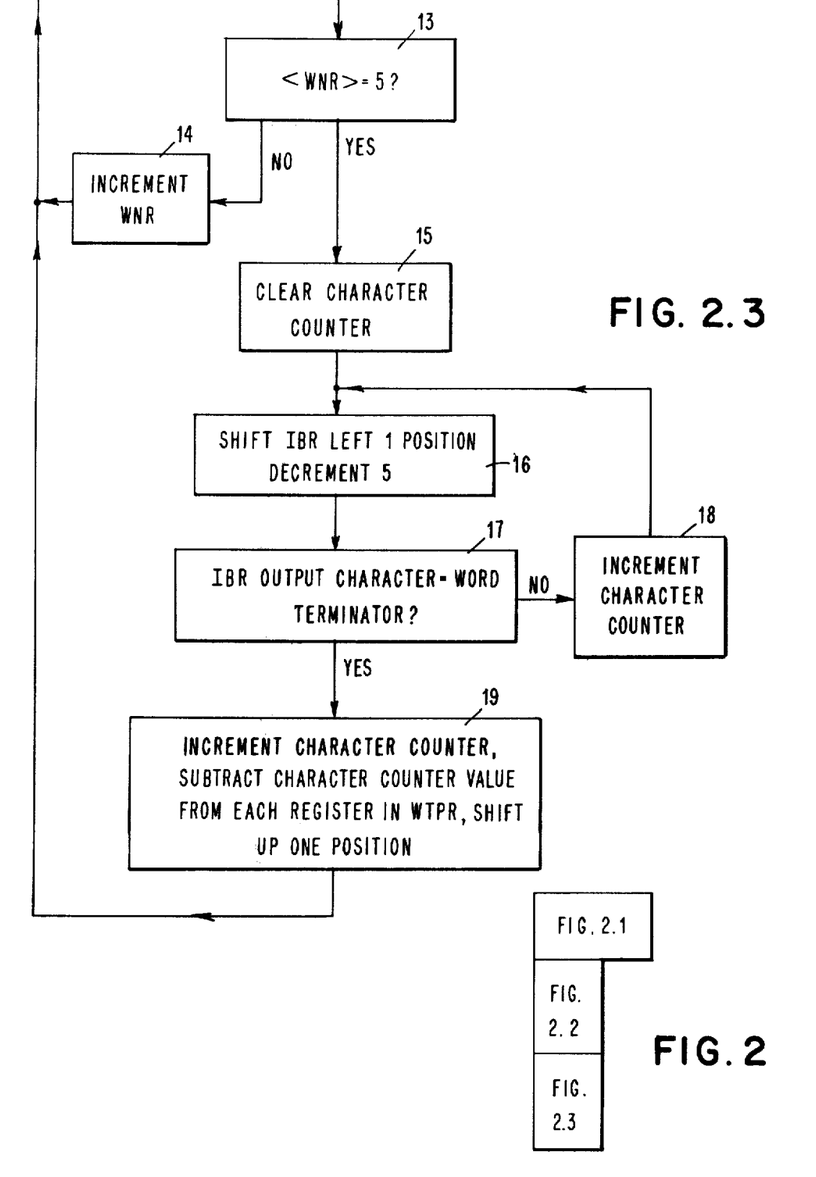
Figure 21:
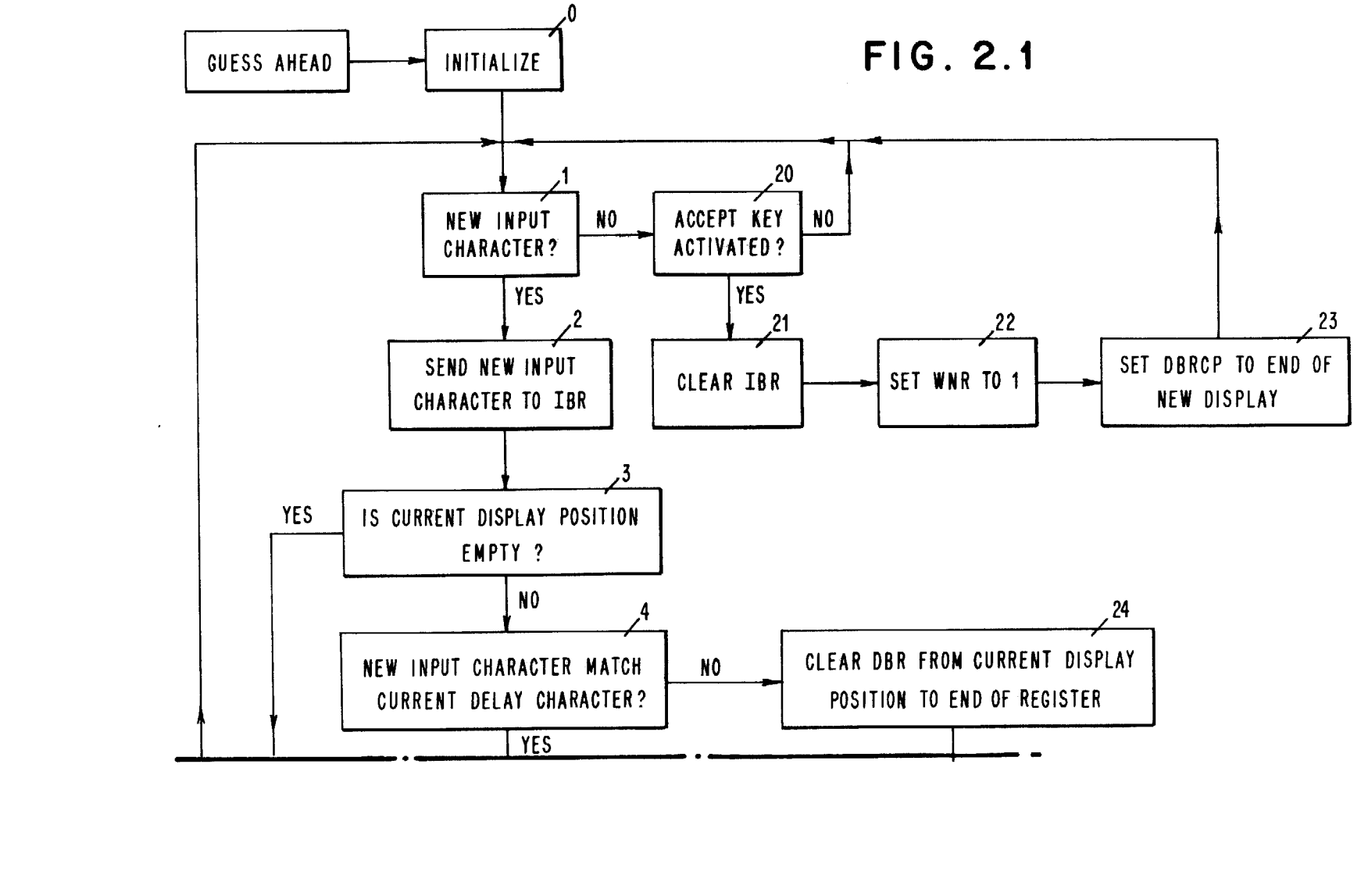
Figure 22:
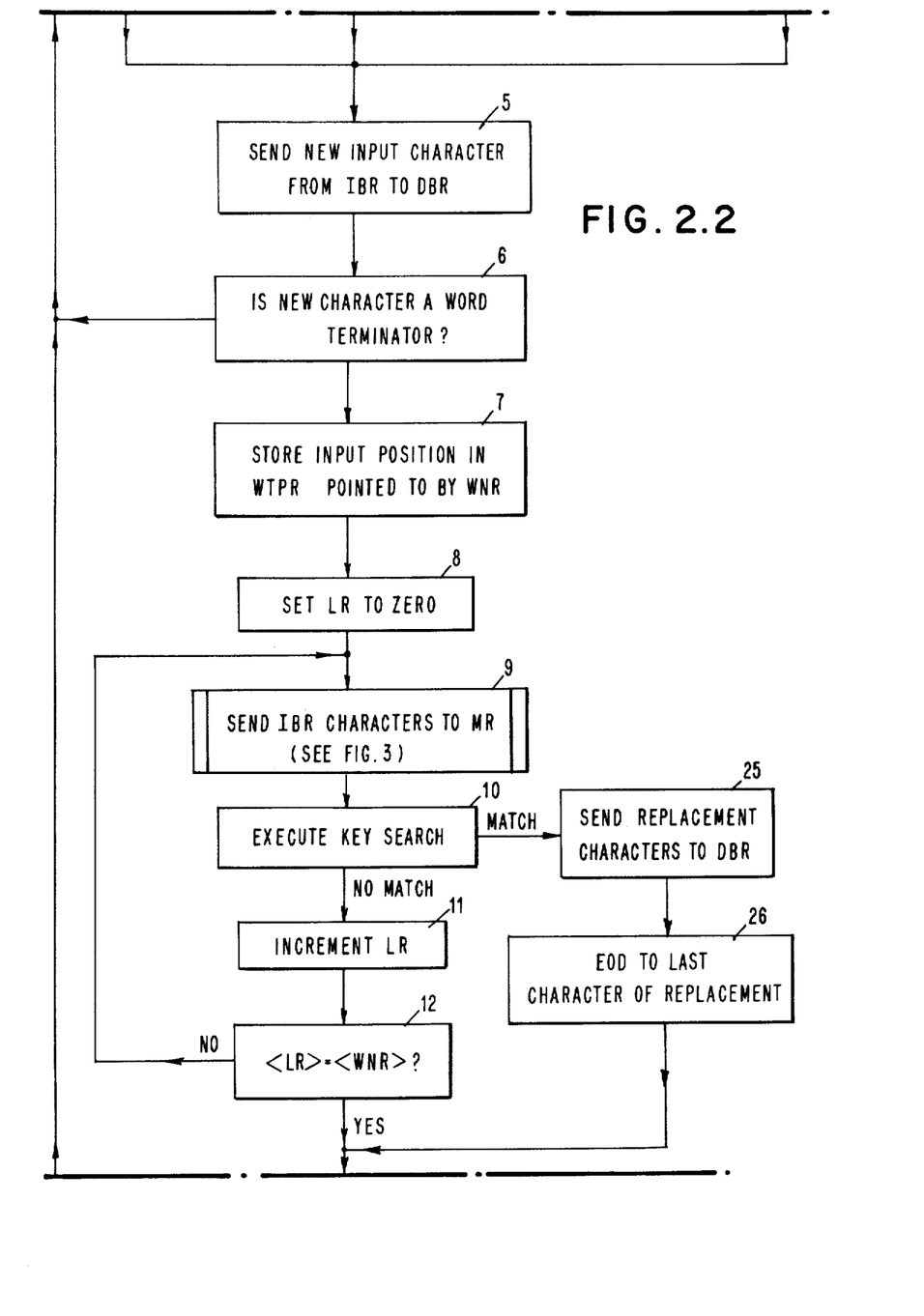

It should be further noted that reference to the following Timing Sequence Charts for the system clearly indicate the specific operations required of the hardware at various points during the control sequences set forth in the flow chart of FIGS. 2.1 through 2.3, as well as the Timing Sequence Charts.

Figure 11:
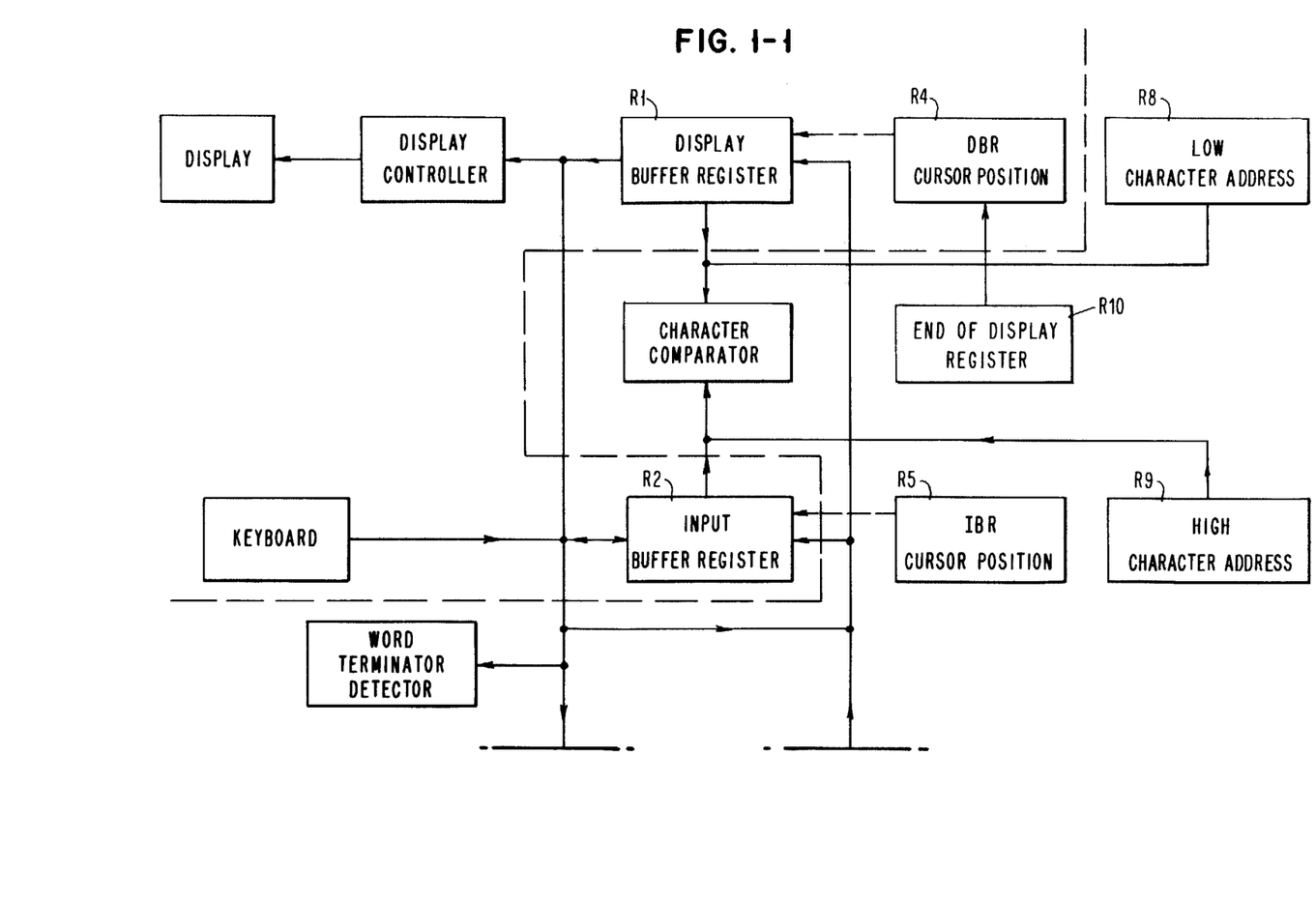

Before proceeding with a detailed description of the operation of the present guess-ahead system there will follow a brief description of the function of the blocks shown in FIG. 1 (1.1 and 1.2). The 'Display' block represents a standard CRT display used with such terminal systems for displaying a predetermined quantity of data entered via the keyboard. The Display Controller Block represents a standard controller as is commonly used with such an interactive terminal with all the functions necessary to access data from the Data Buffer Register and display same on the CRT screen. Registers R4 and R5 labeled DBR Cursor Position and IBR Cursor Position respectively are automatically incremented by the system controls and contain a count which indicates the location of the cursor on the display. In the case of Register R5, the cursor points to the next location in the IBR where a new character will be stored.

Registers R8 and R9 the Low Character Address and High Character Address Registers store the addresses in the IBR which are used to control the gating of words from the IBR into the match register as will be explained subsequently.

The Input Buffer Register R2 is in effect the data input buffer for the present system into which successive input characters and words are entered into the system. As stated previously, it must be of sufficient length to hold a predetermined maximum number of words which are to be used as the match criteria or arguments in subsequent key searches. Thus for example, a hundred character storage locations would probably be adequate for most situations, however, this would be optional with the hardware designer.

The Character Compare block connected to both the DBR and IBR is primarily for the purpose of comparing a new input character in the IBR with a character currently in the equivalent position in the DBR assumedly placed there by the present system as a proposed new string.

The Word Terminator Detector (WTD) examines each new character entered into the system and when it detects a word terminator symbol (*), it signals the Control Unit appropriately and certain specified operations occur which will be set forth subsequently.

The Match Register R3 (MR) is the means in which the current search argument is stored for comparison with all stored keys in Key Memory via the String Comparator. The five registers denoted as R6, R7, R8 and R9, and the Word Terminator Position Register (WTPR) comprise the controls whereby the location of words in the IBR is recorded and kept track of via the word terminator symbols. Utilizing these registers as set forth in the subsequent description, the system is able to extract predetermined groups of words from the IBR and gate same to the MR for search and compare operations. The Loop Register R6 (LR) and the Word Number Register R7 (WNR) together with the WTPR specifically control the successive gating of a diminishing number of word arguments to the search and compare operation as described briefly before, i.e., first 5, then 4, 3, 2 and finally, 1 word arguments.

Figure 3:
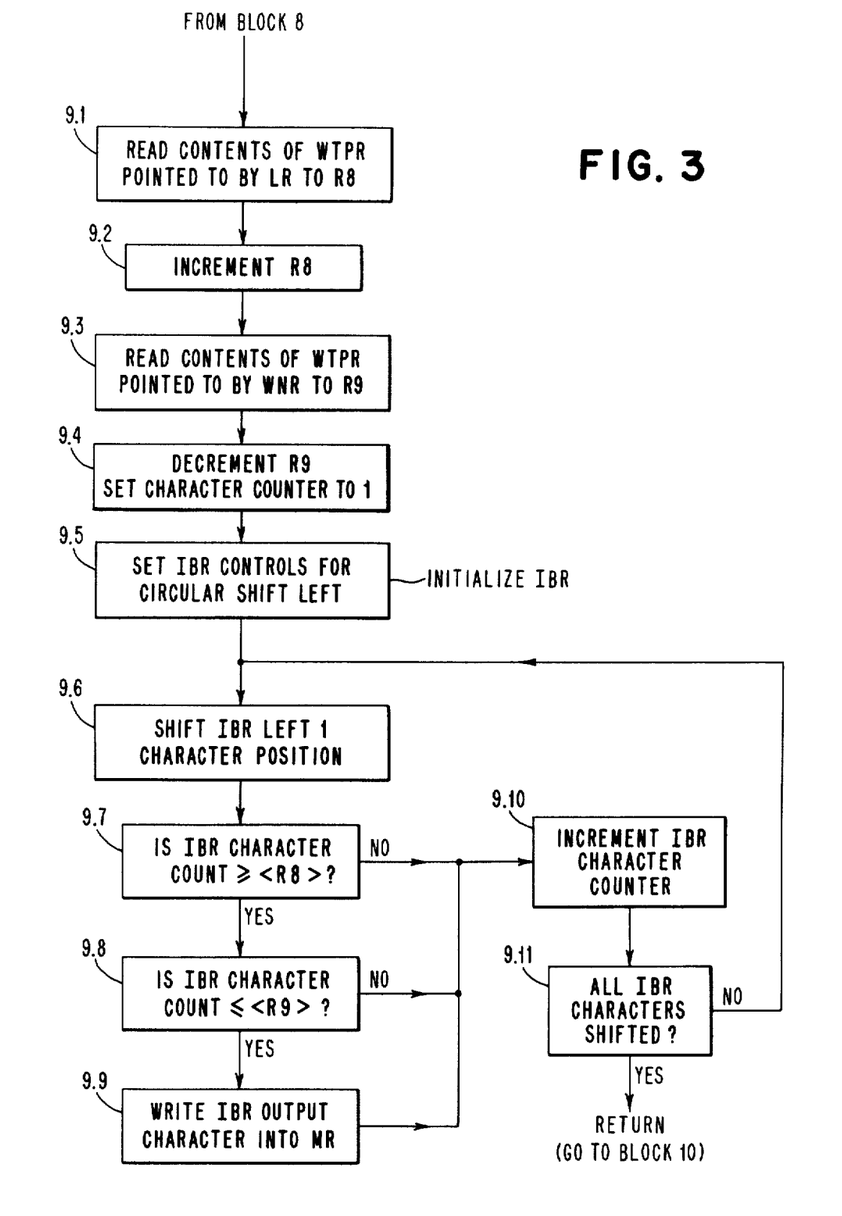
FIG. 3 comprises an expanded flow chart for block 9 of the flow chart of FIGS. 2.1 through 2.3.

The above description thus generally sets forth the function of the various blocks of FIG. 1, however, for a meaningful understanding of their sequence of operations in the overall operation of the system, reference should be made to the subsequent description of the system flow charts as set forth in FIGS. 2 and 3, and also to the detailed Timing Sequence Charts following this section.

The operation of the present system will now be specifically set forth with respect to the flow charts of FIGS. 2.1 through 2.3 and FIG. 3. It will be noted that FIG. 3 comprises an expansion of block 9 of the flow chart of FIG. 2. These flow charts functionally describe the various operations occurring within the system. For a specific recitation of the actual data elements being transferred, reference should be made to the accompanying Timing Sequence Charts, which follow this section. It is specifically noted that the reference numbers in the timing sequence charts specifically relate to given blocks in the flow chart of FIGS. 2 and 3.

To facilitate the following description, it will be assumed that a particular text entry is to be made into the system. In this example, the total text to be entered is "NOW IS THE TIME FOR ALL GOOD MEN TO COME TO THE AID OF THEIR COUNTRY". It is further assumed that in the above text the key consists of three words, "TIME FOR ALL" which will be stored together with other keys in the Key Memory. Further, the complete string is "TIME FOR ALL GOOD MEN TO COME TO THE AID OF THEIR COUNTRY". What is required of the system therefore, is that the key be recognized with the words "TIME FOR ALL" which will reside at some point in the IBR. At this time, the system must cause the complete string "TIME FOR ALL GOOD MEN TO COME TO THE AID OF THEIR COUNTRY" to be entered into the DBR and appropriately displayed.

An understanding of the following description of the flow charts will also be aided by reference to the following Tables 1 and 2 which specifically show the contents of the IBR and WTPR at various stages of the operation of the system. Each step assumes that a new word has been entered and a word terminator symbol (*) has been detected and appropriately stored in the IBR. Table 2 showing the contents of the WTPR literally contains the addresses in the IBR where the word terminators are stored. Thus for example, in step 3 of Table 2, the numbers 4, 7 and 11, are shown in WTPR register postions 1, 2 and 3. Referring to Table 1, step 3, it will be noted that word terminator symbols (*) are stored at the IBRCP addresses, 4, 7 and 11.

Referring now to the flow chart of FIG. 2 (2.1 through 2.3) in block 0, the system is initialized wherein it is assumed that DBR and IBR are empty. In block 0 WNR R7 is set to 1 which will cause the first IBR address at which a word terminator symbol is stored to in turn be stored in register position 1 of the WTPR. Assume now that text data beginning with the letter N is entered into the system. The occurrence of this letter causes the system to continue to block 1 where it is recognized as a new input character. The system then proceeds to block 2.

In block 2 the character N is stored in position 1 of the IBR. It is noted that the IBRCP will cause the character to go in address 1 because the initialization and clearing of the IBR causes the IBRCP register to be reset to a 1. Similarly, the clearing initializing of the system causes the DBRCP, R4 to be similarly set to a 1 when the DBR was cleared. The system then proceeds to block 3 in which the current postion in the DBR pointed to by the DBRCP is checked to see that it is empty. If it is the system proceeds to block 5 wherein the new input character is sent from the IBR to the DBR at the position pointed to by R4. Next the system proceeds to block 6. In block 6 a test is made to see if the character just entered was a word terminator symbol (*). Since in this case it was not, the system returns to block 1. The same sequence of operations continues until the letters NOW have been entered into the system. It will now be observed that a word terminator symbol (*) is being entered into the system and stored in position 4 of the IBR as described above. However, in block 6 the recognition of the word terminator causes the system to proceed to block 7.

In block 7 the number 4, which is the current setting of the IBRCP stored in register 1 of the WTPR, which is the register position currently pointed to by the WNR. In block 8 the system causes LR to be set to 0 and the system proceeds to block 9. The completion of the above sequence of operations through block 8 has caused the characters NOW (*) to be stored in the IBR in positions (addresses) 1, 2, 3 and 4 thereof.

A search operation must now occur since a new word has been entered into the IBR. This operation is performed by blocks 9, 10, 11 and 12. In the case of a successful match, blocks 25 and 26 are also included.

At this point block 9 will be referred to simply as performing the function of sending successive word groups from the IBR to the MR wherein specific key searches will be performed. In this case, at the end of step 9, the single word "NOW" is sent to MR and a search of the keys will assumedly be unsuccessful in block 10 which will cause the system to proceed to block 11. Blocks 11 and 21 control the incrementing and testing of the Loop Register (LR) and in conjunction with block 9 cause the successive sending of word groups from the IBR to the MR until all combinations of the new word just entered have been tried.

However, at the end of step 1 only one data transfer is necessary as there is only one word, i.e., NOW, stored in the IBR and the system proceeds to block 13. Block 13 tests the WNR for a setting of '5'. Since the WNR is currently set to a 1, this test will cause the system to proceed to block 14, wherein the WNR is incremented and the system returns to block 1.

The characters I, S and (*) are now entered in the system by the same mechanism described above. The completion of this operation is represented by the state of the IBR at step 2 in Table 1. The contents of the WTPR are shown in step 2 of Table 2.

This time the operation of blocks 9 through 12 first cause the argument 'NOW IS' and then 'IS' to alone be sent to the MR. This will again result in a 'no match' and the system will again proceed to block 13, which tests the contents of the WNR which is currently set to '2'. Therefore, the system will proceed to block 14 which increments the WNR and returns to block 1. In a similar fashion the system will proceed until the input state of the IBR and WTPR is as shown in step 5 of Tables 1 and 2. As stated previously, since the disclosed embodiment allows a maximum of 5 words to be entered into the IBR for match argument purposes, it is now necessary for the oldest word in the IBR to be, in effect, removed and the contents of the IBR adjusted as shown in step 6. This is accomplished in blocks 15, 16, 17, 18 and 19.

Block 15 causes the Character Counter located in the Control Unit to be reset to a 0. In Block 16, the entire contents of the IBR is in effect shifted to the left so that the character N is gated out. The system then proceeds to block 17 wherein the current setting of the IBRCP is decremented 1. By way of example, at the end of step 5, the IBRCP would have been set to a 21, which is the next blank position in the IBR. The decrementing would cause the value to be changed to 20.

In block 17 a test is made of the leftmost character shifted out, which in this case is an N, to see if it is a word terminator. Since it is not, the system proceeds to block 18 which decrements the Character Counter and returns to blocks 16 and 17. The loop comprising blocks 16, 17 and 18, continues to cause the characters 'OW (*)' to be gated out of the IBR. However, the WTD will now detect the word terminator symbol and cause the system to branch to block 19.

In block 19 the following operations occur. The Character Counter will be incremented. At this point it will contain the number 4, as the 4 characters, 'NOW (*)' have been gated out of the IBR and the remaining words shifted as shown in step 6 of Table 1. The system controls next cause the number 4, which is the current Character Counter value to be subtracted from each of the numbers currently stored in the register position 1 through 5 of the WTPR and then causes these numbers to be shifted up one position. The new contents of the WTPR are shown in step 6 of Table 2.

The exit from block 19, causes the system to return to block 1, at which point the characters ALL (*) will be entered into the system. At the end of block 8, the contents of the IBR are as shown in step 7 of Table 1.

It will now be noted that the key "TIME FOR ALL" is resident in the IBR. At this point blocks 9, 10 and 11 cause the successive argument, IS THE TIME FOR ALL; THE TIME FOR ALL; and finally, TIME FOR ALL, to be successively sent to the MR for key search purposes. However, this time a successful match will be indicated by block 10, since the key 'TIME FOR ALL' is one of the keys stored in the Key Memory. The system next proceeds to block 25, which will cause the entire string contents pointed to by the key to be transferred to the DBR from the Replacement Memory, beginning at the cursor position pointed to by the DBRCP. Thus the letter G would be stored in that position, as it is the beginning of the remainder of the complete string, GOOD MEN TO COME TO THE AID OF THEIR COUNTRY.

Block 26 causes the EOD register to be set to the last character of the replacement string. This is to retain this address in the system in case the string is accepted. All the other pointer registers, i.e., DBRCP, have other functions at this time. The system then proceeds to block 13.

Again blocks 13 through 19 cause the oldest word in the IBR to be removed, since at this point the system does not know whether or not the string just displayed will be accepted by the typist. The system will then return to block 1.

For the moment it will be assumed that the typist is not yet aware that the new string has been displayed and proceeds to type in the character G into the system. The system will proceed as before to block 3. However, at this point the position pointed to by DBRCP is not empty, but contains the letter G, which is the first word of the string just entered.

In block 4 a matching of the new letter with the letter in the DBR is successful which allows the system to proceed to block 6. At this point it will be assumed that the typist sees the new string displayed and presses the accept key. In this event, block 20 is automatically entered which causes the new string to be accepted into the input system by proceeding to block 21 which clears the IBR and appropriately resets the IBRCP.

Block 22 causes the WNR to be set to 1 and block 23 causes the DBRCP to be set to the next vacant character at the end of the new string just entered. This value is extracted from the EOD which was loaded in block 26. The system then returns to block 1 and awaits the entry of a new character by the typist.

It should be noted that had the test made in block 4 been unsuccessful, the system would have proceeded to block 24, which would have automatically cleared the DBR from the current display position to the end of the string just entered. Thus in effect, the typist has advised the system that the string is not correct and the system must proceed in the usual fashion, i.e., keyboard entry.

This completes the description of the overall operation of the present system as set forth in FIG. 2 (2.1 through 2.3). However, to complete the description of the present embodiment, reference should now be made to FIG. 3 which comprises an expansion of block 9 of FIG. 2. In this block the contents of the IBR, as defined by the current settings of LR and WNR, are transferred to the MR for comparison in the String Comparator. The function of the operations defined in the flow chart of FIG. 3 is to extract the address in the IBR of the first character of a word argument group and the last character of said word argument group and cause all characters in the IBR between (and including) these addresses to be gated to the MR for comparison purposes. It will be assumed that the IBR and the WTPR are configured as in step 7 and that the LR is set to 0 (per block 8) and that the WNR is set to 5.

Block 9.1 causes the 0 currently stored in WTPR at register 0 to be stored in register R8. In block 9.2 the register 0 is incremented so that a 1 is now stored therein. Block 9.3 causes the contents of the WTPR register pointed to by the WNR to be stored in register R9. In this case the number 20 will be stored in register R9 since it is the number in register 5 of the WTPR. In block 9.4 this value is decremented by 1. The Character Counter is set to 1. It should be noted that the two registers R8 and R9 now define the limits (addresses) between which all of the characters stored within the IBR are to be in effect shifted into the MR.

In block 9.5, the IBR controls are set to effect a circular shift left beginning with the character pointed to by the contents of register R8 and ending with the character pointed to by the contents of register R9. At this point, blocks 9.6, 9.7, 9.8, 9.9 and 9.10 cause successive shifting of the IBR until all of the characters between address positions 1 and 19 in the IBR have been shifted to the MR and returned to their original position in the IBR. At this point the system proceeds to block 10, to cause a key search. If unsuccessful, the system proceeds to blocks 11 and 12 which will cause block 9.1 on FIG. 3 to again be entered and a new word group is sent to the MR for comparison purposes. The operation would proceed as above, however, it will be noted that at the end of block 9.4 the values 4 and 19 would be stored in registers R8 and R9 to effectively drop the argument word IS from the comparison.

This sequence of operations would continue with an additional word dropped until finally the last argument sent to the MR would be the word ALL. This of course presumes that no match was found. At this point block 13 would be reentered and the oldest word would be removed from the IBR to make room for a new word.

This completes the description of the operation of the presently disclosed guess-ahead feature. It should be noted that the following Timing Sequence Charts, as stated above, disclose the specific operations carried out within the hardware of FIG. 1 (FIG. 1.1 and FIG. 1.2). It will also be noted that all of the data flow paths are not shown, such as the data paths for gating the contents of the various registers in the WTPR to registers R8 and R9. Provision of such buses would be obvious and inclusion of same would merely obfuscate the invention. Similarly, specific data paths for comparing the contents of the Character Counter with contents of registers R8 and R9 are not shown for the same reason.

TABLE I
CONTENTS OF IBR

| Step | |
|---|---|
| 1 | N O W * |
| 2 | N O W * I S * |
| 3 | N O W * I S * T H E * |
| 4 | N O W * I S * T H E * T I M E * |
| 5 | N O W * I S * T H E * T I M E * F O R * |
| 6 | I S * T H E * T I M E * F O R * |
| 7 | I S * T H E * T I M E * F O R * A L L * |

IBRCP Value
(adders) 1 2 3 4 5 6 7 8 9 10 11 12 13 14 15 16 17 18 19 20

TABLE II
CONTENTS OF WTPR

| Step | |
|---|---|
| 1 | 0 4 |
| 2 | 0 4 7 |
| 3 | 0 4 7 11 |
| 4 | 0 4 7 11 16 |
| 5 | 0 4 7 11 16 20 |
| 6 | 0 4 7 12 16 |
| 7 | 0 4 7 12 16 20 |
| WTPR-Reg # | 0 1 2 3 4 5 |

TIMING SEQUENCE CHART

0. Clear all registers.
   Increment R4, R5, and R7.

1. Set Input Multiplexor (IMPX), all places, to address of keyboard character line:
   If status signal=1, go to step 2.
   If status signal=0, go to step 20.
2. Write keyboard input data into R2 at location addressed by R5.
   Increment R5.
3. Set IMPX to address of WTD line.
   Read R1 at location addressed by R4.
   If status signal=0, go to step 4.
   If status signal=1, go to step 5.
4. Set IMPX to address of Character Comparator (CC).
   Read R1 at location addressed by R4 to upper input of CC.
   Read R2 at location addressed by R5 to lower input of CC.
   If status signal=0, go to step 24.
   If status signal=1, go to step 5.
5. Increment R4.
   Write character from R2 at location addressed by R5 into R1 at location addressed by R4.
6. Set IMPX to address of WTD line.
   Read R2 at location addressed by R5.
   If status signal=0, go to step 1.
   If status signal=1, go to step 7.
7. Write contents of R5 into WTPR pointed to by R7.
8. Clear R6.
9. 9.1 Load R8 with contents of WTPR pointed to by R6.
   9.2 Increment R8.
   9.3 Load R9 with contents of WTPR pointed to by R7.
   9.4 Decrement R9.
   Set Character Counter to 1.
   9.5 Set R2 controls for circular left shift.
   9.6 Shift R2 left one character position.
   9.7 Set IMPX to address of CC.
   Read contents of R8 into upper input of comparator.
   Read contents of Character Counter into lower input of Character Comparator.
   If status signal=0, go to step 9.10.
   If status signal=1, go to step 9.8.
   9.8 Set IMPX to address of CC.
   Read contents of R9 into lower input of CC.
   Read contents of Character Counter into upper input of Character Comparator.
   If status signal=0, go to step 9.10.
   If status signal=1, go to step 9.9.
   9.9 Write output of R2 into R3.
   9.10 Increment Character Counter.
   9.11 Set IMPX to address of Character Counter "count equal to zero" line.
   If status signal=0, go to step 9.6.
   If status signal=1, go to step 10.
10. 10.1 Set Key Memory (KM) Memory Address Generator (MAG) to zero.
    10.2 Set IMPX to address of String Comparator (SC).
    10.3 Increment KM MAG and read key string from KM to SC.
    10.4 If status signal=1, go to step 25.
    If status signal=0, go to step 10.5.
    10.5 Set IMPX to address of KM MAG "upper limit address" line.
    If status signal=0, go to step 10.2.
    If status signal=1, go to step 11.
11. Increment R6.
12. Set IMPX to address of CC.
    Read contents of R6 to upper input of C.
    Read contents of R7 to lower input of C.
    If status signal=0, go to step 9.1.
    If status signal=1, go to step 13.
13. Set IMPX to address of R7 "upper limit" line.
    If status signal=0, go to step 14.
    If status signal=1, go to step 15.
14. Increment R7.
15. Clear Character Counter.
16. Shift R2 left one character position.
    Decrement R5.
17. Set IMPX to address of WTD line.
    Read R2 at location addressed by R5.
    If status signal=0, go to step 18.
    If status signal=1, go to step 19.
18. Increment Character Counter.
19. Increment Character Counter.
    Subtract Character Counter value from contents of WTPR #1 through WTPR #5.
    Write contents of WTPR #2 into WTPR #1.
    Write contents of WTPR #3 into WTPR #2.
    Write contents of WTPR #4 into WTPR #3.
    Write contents of WTPR #5 into WTPR #4.
    Go to step 1.
20. Set IMPX to address of ACCEPT-key line from keyboard.
    If status signal=0, go to step 1.
    If status signal=1, go to step 21.
21. Clear R2.
22. Clear R7.
    Increment R7.
23. Clear R4.
    Write contents of R10 into R4.
24. Clear R1 from location addressed by R4 to end of R1.
25. 25.1 Set IMPX to address of "end of string" line from Replacement Memory (RM).
    25.2 Load contents of KM MAG into RM MAG.
    25.3 Load R10 with value stored in R4.
    25.4 Read next character of replacement string from RM into R1 at location addressed by R10.
    25.5 If status signal=1, go to step 26.
    If status signal=0, go to step 25.6.
    25.6 Increment R10.
    25.7 Go to step 25.4
26. Save the contents of R10.

Having thus described my invention, what I claim as new, and desire to secure by Letters Patent is:

1. In an interactive terminal system, including a keyboard, memory means and a display device wherein input data is entered into the system via the keyboard and displayed, the improvement in said system which comprises;
   means for continually and dynamically evaluating the input data as a search argument to determine if it is the beginning of a string of data currently stored in a first section of the system memory,
   wherein said means for evaluating includes means for comparing each new word entered into the system in combination with a predetermined maximum number of words immediately preceding said new word against a predetermined key list in said memory means, said key list comprising the initial words contained in a stored string and means operative to access the complete stored string in the event of a positive determination, further means responsive to a positive determination by said evaluating means to cause the complete stored data string to be displayed on the display device, means operative, upon a determination that the displayed string represents data which the terminal operator desires to enter into the system to cause said string, to be actually entered as data input into a second section of the system memory, and alternative means in said evaluating means for continuing the entry of data via the keyboard and, for causing the displayed string on the display screen to be removed in response to the operator's continuing the entry of further data without affirmatively indicating an acceptance of the displayed data and, including means for limiting the maximum number of words as the search argument which are considered for a key search, comprising means for determining that the maximum number of words has been entered into the system via the keyboard and for removing the oldest word as each new word is entered, thus dynamically changing the search argument.

2. In a data input terminal including a display, keyboard means for entering data, first memory means for storing predetermined data strings and a key memory means for storing search keys, each of which is specifically related to a particular data string stored in said first memory means, processor and logic means connected to said display, keyboard means, first memory means, and key memory means, the improvement which comprises a guess-ahead method for entering said prestored strings of data including; entering data in said terminal via said keyboard a word at a time, combining each new word with a predetermined number of previously entered words to form a key search argument, initiating a key search in said key's memory using said argument, if said search is successful accessing the entire string from said first memory means, displaying on said display the entire string of data to which said key relates, if the string is accepted by the terminal operator, entering said complete data string as data input to the terminal and, continuing the inputting of data via the keyboard beginning at the end of said accepted string, and if said key search is unsuccessful, removing the displayed string by entering a new word without affirmatively indicating an acceptance of the displayed data, forming a new search argument utilizing each newly entered word and previously entered words and continuing to form such arguments and continuing to perform key searches, and further including limiting the maximum number of words as said key search argument which are considered for a key search, comprising determining that the maximum number of words has been entered into the system via the keyboard and removing the oldest word as each new word is entered, thus dynamically changing the search argument.

3. A guess-ahead data entry method as set forth in claim 2 wherein said key search includes comparing each search argument against all of the keys stored in the key memory and accessing the related string when a successful key search is indicated.

4. An interactive terminal system comprising a plurality of terminals connected to a common communication means, each terminal including a display means and keyboard means for entering data, each terminal further having available via said system communication means, first memory means for storing predetermined data strings and second memory means for storing search keys, each of which is specifically related to a particular data string stored in said first memory means, third memory means for storing data to be placed on said display and accepted as desired input into said interactive terminal system from said keyboard and said first memory means, means for anticipating when an operator is attempting to enter a data string which has been previously stored in said first memory means comprising first buffer means for storing data as it is entered into the terminal via said keyboard, means associated with said buffer means for indicating when a complete data word has been entered into said first buffer means, means for comparing each newly entered word together with a predetermined number of words previously entered into said first buffer means with all of the keys in said key storage means, means operative upon a successful comparison to cause the complete data string related to the key which resulted in the successful comparison to be entered into said third memory means and displayed, and means responsive to an affirmative indication by the operator of the terminal for causing the complete data string displayed on said display means and stored in said third memory means to be accepted as input data, alternative means for continuing the entry of data via the keyboard and, for causing the displayed string on the display screen to be removed in response to the operator's continuing the entry of further data without affirmatively indicating an acceptance of the displayed data and, including means coupled to said first buffer means for limiting the maximum number of words which are considered for a key search, comprising means for determining that the maximum number of words has been entered into the system via the keyboard and for removing the oldest word as each new word is entered, thus dynamically changing the search argument.

5. An interactive terminal system as set forth in claim 4 including means in each terminal for causing each new character entered into said terminal to be simultaneously entered into said first buffer means and also into said third storage means from which it is accessed and displayed upon said screen.

6. An interactive terminal system as set forth in claim 5 including means in each terminal for removing the displayed string from the display means and also from said third storage means in the event that the displayed string is not the data entry text desired by the operator.

7. An interactive terminal system as set forth in claim 6 wherein said first buffer means includes control means for determining when said maximum number of words is stored therein while new data is being entered into the system and said comparison means includes means for extracting predetermined combinations of words from said first buffer means for comparison with said keys stored in said key storage means whereby the most recently entered word is always included in said search argument.

8. An interactive terminal system as set forth in claim 7 wherein said first buffer storage means and control means include means operative upon the filling of said buffer with said predetermined maximum number of words to effectively remove the oldest word in said buffer means when a new word is being entered by the operator.

* * * * *